(12) United States Patent
Bader et al.

(10) Patent No.: US 9,580,863 B2
(45) Date of Patent: Feb. 28, 2017

(54) PROCESS FOR OBTAINING LOW RESIDUAL ARAMID MATERIALS

(71) Applicant: E I DU PONT DE NEMOURS AND COMPANY, Wilmington, DE (US)

(72) Inventors: Yves Bader, Crozet (FR); Kurt Hans Wyss, Chavannes De Bogis (CH); Bienvenido De Cuendias Herrero, Oviedo CP (ES)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 82 days.

(21) Appl. No.: 14/396,390

(22) PCT Filed: May 1, 2013

(86) PCT No.: PCT/US2013/038971
§ 371 (c)(1),
(2) Date: Oct. 23, 2014

(87) PCT Pub. No.: WO2013/166086
PCT Pub. Date: Nov. 7, 2013

(65) Prior Publication Data
US 2015/0087775 A1     Mar. 26, 2015

Related U.S. Application Data

(60) Provisional application No. 61/641,945, filed on May 3, 2012.

(51) Int. Cl.
| | | |
|---|---|---|
| *D06M 15/59* | (2006.01) | |
| *D06M 13/188* | (2006.01) | |
| *D01D 10/06* | (2006.01) | |
| *D01F 6/60* | (2006.01) | |
| *D01F 6/80* | (2006.01) | |
| *D06M 13/00* | (2006.01) | |
| *D06M 11/65* | (2006.01) | |
| *D06M 13/144* | (2006.01) | |
| *D01F 13/04* | (2006.01) | |
| *D06M 101/36* | (2006.01) | |

(52) U.S. Cl.
CPC ............ *D06M 15/59* (2013.01); *D01D 10/06* (2013.01); *D01F 6/605* (2013.01); *D01F 6/805* (2013.01); *D01F 13/04* (2013.01); *D06M 7/00* (2013.01); *D06M 11/65* (2013.01); *D06M 13/144* (2013.01); *D06M 13/188* (2013.01); *D06M 2101/36* (2013.01); *Y02P 70/629* (2015.11)

(58) Field of Classification Search
CPC ...................................................... D06M 15/59
See application file for complete search history.

(56) References Cited

U.S. PATENT DOCUMENTS

| | | | |
|---|---|---|---|
| 3,094,511 A | 6/1963 | Hill, Jr. et al. | |
| 3,351,127 A | 11/1967 | Hill, Jr. et al. | |
| 3,673,143 A | 6/1972 | Bair et al. | |
| 3,819,587 A | 6/1974 | Kwoleck | |
| 3,869,429 A | 3/1975 | Blades | |
| 4,066,395 A * | 1/1978 | Soiron | D06P 1/6135 8/583 |
| 4,172,938 A | 10/1979 | Mera et al. | |
| 4,668,234 A | 5/1987 | Vance et al. | |
| 4,755,335 A | 7/1988 | Ghorashi | |
| 4,883,496 A | 11/1989 | Ghorashi | |
| 5,096,459 A | 3/1992 | Ghorashi | |
| 5,824,614 A * | 10/1998 | Gadoury | D06P 1/0096 442/301 |
| 2013/0012629 A1 | 1/2013 | Takiue et al. | |
| 2013/0023610 A1 | 1/2013 | Kikuchi et al. | |

FOREIGN PATENT DOCUMENTS

| | | |
|---|---|---|
| EP | 2336402 A1 | 6/2011 |
| EP | 2551386 A1 | 1/2013 |
| EP | 2559792 A1 | 2/2013 |
| WO | 93/25748 A1 | 12/1993 |
| WO | 2006/105225 A1 | 10/2006 |
| WO | 2007/108948 A1 | 9/2007 |
| WO | 2011/011395 A1 | 1/2011 |
| WO | 2011/118022 A1 | 9/2011 |
| WO | 2011/129279 A1 | 10/2011 |

\* cited by examiner

*Primary Examiner* — Ling Choi
*Assistant Examiner* — Lanee Reuther

(57) ABSTRACT

The present invention provides for a process for reducing the content of one or more residuals in aramid fibers or filaments, comprising, in this order, the steps of introducing the aramid fiber or filaments into a extraction solution adjusted to a pH ranging from of 2 to 7, adjusting the extraction solution and the aramid fibers or filaments to a temperature of to from 80° C. to 140° C., removing the aramid fibers or filaments from the extraction solution, introducing the aramid fiber or filaments into a first rinsing solution adjusted to a pH ranging from of 2 to 7, optionally comprising a detergent, adjusting the first rinsing solution and the aramid fibers and filaments to a temperature of from 70° C. to 100° C., removing the aramid fibers or filaments from the first rinsing solution.

12 Claims, No Drawings

PROCESS FOR OBTAINING LOW RESIDUAL ARAMID MATERIALS

FIELD OF THE INVENTION

The present invention relates to aramid fibers or filaments and processes for extracting one or more residuals therefrom.

BACKGROUND OF THE INVENTION

Garments made from aramid fibers or aramid filaments are known in the art of personal protection equipment for conferring excellent protection against radiant heat, fire and electric arcs, as well as for their excellent mechanical properties.

For this reason, garments comprising the aforementioned aramid materials are extensively used in many protective garments, such as industrial protective garments, fire fighter gear, police or military uniforms.

The use of aramid fibers or filament in such garments or uniforms implies that such fibers or filaments must sometimes be extensively colored, not only for aesthetic purposes but also often out of necessity to be clearly visible. Other examples include the coloring for military-purpose garments such as for example camouflage and specific IR reflectance needs.

For coloring aramid materials, there exist multiple dyeing procedures, most of which use synthetic dyes. Generally, such dyeing processes involve heating the aramid material in an aqueous solution of cationic dye, carrier substances and inorganic salts, followed by a one or more rinsing steps. Other coloring routes include the incorporation of pigment in the polymer solution before the spinning process, known as spun-in pigments.

However, such synthetic dyes and pigments are produced on an industrial scale, and may sometimes comprise residual amounts of undesirable compounds used in the synthesis of such dyes. Such residual compounds are generally present in low amounts and include, for example, different isomers of dichlorobenzene and derivatives thereof.

It is desirable to reduce the levels of such compounds in finished aramid material without adversely affecting or washing away finishing compounds that were purposefully applied to the aramid material, such as for example fluorinated finishing compounds.

It is furthermore desirable to reduce the levels of such compounds in aramid material without negatively affecting the mechanical properties of the aramid material, or even more desirable to reduce the concentration of such levels in aramid material by simultaneously improving the to mechanical properties of the aramid material.

Furthermore, there is a constant desire to increase the heat, flame and electric arc resistance properties of the aramid material in order to manufacture improved personal protection equipment that protects more effectively while using the same amount of aramid material. In addition, it is also desirable to keep, or even enhance the dimensional stability of the aramid material as well as other wanted features such as for example increasing the crystallinity of the fiber which influences directly on mechanical and thermal stability.

The crystallinity of the aramid fiber may be increased above 15%, when measured by Raman spectroscopy as described in WO2011011395, by applying heat and tension to the fiber, e.g. by stretching the fiber at a temperature above its glass transition point, or by chemically treating the fiber in a coloring, dyeing or mock dyeing process with dye carriers such as benzyl alcohol and benzophenone. Examples of such methods may be found in U.S. Pat. Nos. 4,668,234, 4,755,335, 4,883,496 and 5,096,459. Such mock dyeing methods typically employ carrier components and salt components in considerable concentrations, which renders them economically undesirable. There exists therefore a need to reduce the use of such costly components, which also need to be disposed of in an environmentally sustainable method, in order to provide for a more cost-effective process.

Other known methods that increase crystallinity in meta-aramids comprise the step of heating the fiber, preferably in the form of a tow, in steam at temperatures between 140° C. and 165° C. While aramid fiber and especially meta-aramid fiber has good heat resistance properties, the dyes commonly used to dye aramid fibers have not. Thus, it is not so far not practically feasible to increase crystallinity by heat in a dyed aramid fiber without thermally degrading the dye.

SUMMARY OF THE INVENTION

The present invention provides for a process for reducing the to content of one or more residuals in aramid fibers or filaments, comprising, in this order, the steps of introducing the aramid fiber or filaments into a extraction solution adjusted to a pH ranging from of 2 to 7, adjusting the extraction solution and the aramid fibers or filaments to a temperature of from 80° C. to 140° C., removing the aramid fibers or filaments from the extraction solution, introducing the aramid fiber or filaments into a first rinsing solution adjusted to a pH ranging from of 2 to 7, optionally comprising a detergent, adjusting the first rinsing solution and the aramid fibers and filaments to a temperature of from 70° C. to 100° C., removing the aramid fibers or filaments from the first rinsing solution, wherein the extraction solution is an aqueous solution comprising of from 0 to 40 g/l of a salt component and of from 0 to 40 g/l of a carrier component, and wherein the sum of the salt and carrier components is of from 20 g/l to 80 g/l.

The present invention further provides for a meta-aramid fiber or filament obtainable by the above process, as well as yarns and garments made thereof.

DETAILED DESCRIPTION

In the context of the present disclosure, the term "aramid" refers to a polyarnide wherein at least 85% of the amide (—CONH—) linkages are attached directly to two aromatic rings. Additives can be used with the aramid and, in fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Suitable aramid fibers are described in Man-Made Fibers—Science and Technology, Volume 2, Section titled Fiber-Forming Aromatic Polyarnides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511. Meta-aramids are those aramids where the amide linkages are in the meta-position relative to each other, and para-aramids are those aramids where the amide linkages are in the to para-position relative to each other. The aramids most often used are the meta-aramid poly(metaphenylene isophthalamide) and the para-aramid poly(paraphenylene terephthalamide).

In the context of the present disclosure, the term "liquor ratio", represented as Value A:Value B, relates to the ratio between the weight of the aramid processed (Value A) and the weight of the extraction solution (Value B) employed.

In the context of the present disclosure, the term "crystalline" relates to a degree of crystallinity of more than 15%, preferably more than 20%, more prefarbly above 25% or between 25 and 40%, when measured by Raman spectroscopy as described in WO2011011395.

The process according to the present invention is not limited to the reduction of residuals in dyed, colored or pigmented aramid material only, but is also useful in reducing residuals in raw, i.e. undyed, aramid material.

The present invention provides for a process for reducing the content of one or more residuals in aramid fibers or filaments, comprising, in this order, the steps of introducing the aramid fiber or filaments into an extraction solution adjusted to a pH ranging from of 2 to 7, adjusting the extraction solution and the aramid fibers or filaments to a temperature of from 80° C. to 140° C., removing the aramid fibers or filaments from the extraction solution, introducing the aramid fiber or filaments into a first rinsing solution adjusted to a pH ranging from of 2 to 7, optionally comprising a detergent, adjusting the first rinsing solution and the aramid fibers and filaments to a temperature of from 70° C. to 100° C., removing the aramid fibers or filaments from the first rinsing solution, wherein the extraction solution is an aqueous solution comprising of from 0 to 40 g/l of a salt component and of from 0 to 40 g/l of a carrier component and wherein the sum of the salt and carrier components is of from 20 g/l to 80 g/l.

Because the process according to the invention is carried out at a temperature of from 80° C. to 140° C., the present process is further particularly suitable for reducing residuals, not only in aramid fibers or filaments, but also in yarns comprising aramid fiber or filament and at least one antistatic fiber, such as for example fibers having a conductive to carbon-based component and a polymer component.

The process according to the present invention is particularly effective when the aramid fiber or filament is a dried, crystalline meta-aramid fiber or filament obtainable by dry spinning or wet-spinning, and preferably by dry-spinning.

The dried, crystalline meta-aramid fiber or filament may be obtained by drying the as-spun fiber or filament by conventional drying methods and subsequently drawing the fiber or filament in a heated environment, such as for example heated rolls or steam, to increase the crystallinity of the fiber or filament. Such methods are well-known in the art of aramid materials and will therefore not be described in further detail for the sake of brevity.

Meta-aramid fiber or filament obtainable by dry spinning can be easily recognized under microscope by its typical "dog bone shape" cross section and its smooth outer skin surface.

The residuals that may be reduced in aramid fibers or filaments by performing the process according to the present invention are residuals inherently present in the manufacturing and/or dyeing process of aramid fibers or filaments.

Non-limiting examples of such residuals present in the manufacturing process are aprotic solvents such as N,N-dimethylacetamide and N,N-dimethylformamide, N-methyl-2-pyrrolidone and dimethylsulfoxide.

Other residuals, which are typically not present in the manufacturing process but may be present in dyed aramid fiber or filament are chlorobenzene and its derivatives, such as for example ortho-dichlorobenzene.

Ortho-dichlorobenzene (ODCB) is used as a process solvent in the production of oxazine pigments, pyranthrone dyes and anthraquinone dyes, and the present process allows to reduce the content of ortho-dichlorobenzene in aramid fibers or filaments dyed with the above-mentioned pigments and dyes, without negatively affecting the coloration properties such as for example a thermal degradation of pigments. Other residuals that may be reduced in aramid fibers or filament by the present to process are metal ions and inorganic salts such as for example calcium chloride.

The process according to the present invention is, however, not limited to the reduction of only the aforementioned compounds, but instead may also be useful to remove any type of residuals in aramid fiber or filaments, whether dyed or non-dyed.

The process for reducing the content of one or more residuals in aramid fibers or filaments according to the present invention comprises, in this order, the steps of introducing the aramid fiber or filaments into a extraction solution adjusted to a pH ranging from of 2 to 7, adjusting the extraction solution and the aramid fibers or filaments to a temperature of from 80° C. to 140° C., removing the aramid fibers or filaments from the extraction solution, introducing the aramid fiber or filaments into a first rinsing solution adjusted to a pH ranging from of 2 to 7, optionally comprising a detergent, adjusting the first rinsing solution and the aramid fibers and filaments to a temperature of from 70° C. to 100° C., removing the aramid fibers or filaments from the first rinsing solution, wherein the extraction solution is an aqueous solution comprising of from 0 to 40 g/l of a salt component and of from 0 to 40 g/l of a carrier component, and wherein the sum of the salt and carrier components is of from 20 g/l to 80 g/l.

The aramid fiber or filament may be introduced into the extraction solution such as to perform the process according to the present invention in a batch wise or continuous fashion.

Suitable machinery in which the process may be carried out may be chosen among machinery known in the art of textile dyeing, such as piece dying machinery, jet dyeing machinery, package dyeing machinery, jig and beam dyeing machinery, or continuous dyeing machinery.

In the case where the aramid fiber or filament is in the form of a yarn, the preferred machinery is a package dyeing machinery, whereas in the case where the aramid fiber or filament is in the form of a textile, the preferred machinery is a beam dyeing machinery.

When the process according to the present invention is carried out to in a package dyeing machine, the extraction solution may be forced by pressure through a package of aramid fibers or filaments (usually a spool of yarn) by applying a pressurized flow of extraction solution from the inside of the package to the outside of the package. This may be achieved, among other methods, by stacking spools of yarn on perforated rods in a rack and immersed in a tank where the extraction solution is then forced outward from the perforations of the rods under pressure.

The extraction solution useful in the process according to the present invention may be adjusted to an acidic pH, preferably to a pH of from 2 to 7, more preferably to a pH of from 3 to 5.

The pH may be adjusted by adding acid to the extraction solution until the desired pH is obtained. Suitable acids may be chosen among organic and inorganic acids and/or derivatives thereof, such as formic acid, acetic acid and halogenated derivatives thereof, propanoic acid, citric acid, sulfuric acid, nitric acid, and others. Preferably, the acid is either acetic acid or formic acid.

The extraction solution is essentially free of any coloring ingredient such as for example colorants, dyes and pigments.

The extraction solution useful in the process according to the present invention may be an aqueous solution comprising of from 0 to 40 g/l of a salt component and of from 0 to 40 g/l of a carrier component, and in which the sum of the salt and carrier components is of from 20 g/l to 80 g/l and preferably is of from 20 g/l to 60 g/l, more preferably of from 20 g/l to 40 g/l.

Preferably the extraction solution useful in the process according to the present invention is an aqueous solution consisting of water, of from 0 to 40 g/l of a salt component and of from 0 to 40 g/l a carrier component and in which the sum of the salt and carrier components is of from 20 g/l to 80 g/l and preferably is of from 20 g/l to 60 g/l, more preferably of from 20 g/l to 40 g/l.

In the process according to the present invention, the liquor ratio may be between 1:1 and 1:60 or between 1:1 and 1:180.

The salt component of the extraction solution may be chosen to among organic salts such as sodium benzoate and inorganic salts, and is preferably chosen from inorganic salts such as for example alkaline or earth alkaline salts like $NaNO_3$, $Na_2SO_4$, $NaCl$, $NaHCO_3$. Alternatively, organic compounds such as urea and sodium or potassium benzoate may be use as well.

The salt component of the extraction solution may be preferably comprised in the extraction solution in an amount ranging of from 0 to 20 g/l when the liquor ratio is between 1:1 and 1:20, provided that the sum of the salt and carrier components is of from 20 g/l to 60 g/l and preferably is of from 20 g/l to 40 g/l.

The salt component of the extraction solution may be preferably comprised in the extraction solution in an amount ranging of from 20 to 40 g/l when the liquor ratio is between 1:20 and 1:60 or between 1:20 and 1:180; provided that the sum of the salt and carrier components is of from 20 g/l to 80 g/l and preferably is of from 20 g/l to 65 g/l, more preferably of from 20 to 45 g/l.

The salt component of the extraction solution may be more preferably present in an amount of from 20 to 40 g/l, when the liquor ratio is between 1:60 and 1:180 or between 1:100 and 1:180; provided that the sum of the salt and carrier components is of from 20 g/l to 50 g/l, more preferably of from 20 to 40 g/l.

In a particularly preferred embodiment, the salt component of the extraction solution may be present in an amount of from 20 to 40 g/l, when the liquor ratio is between 1:60 and 1:180 or between 1:100 and 1:180; provided that the sum of the salt and carrier components is of from 20 g/l to 40 g/l and the amount of carrier component is essentially 0 g/l, i.e. the extraction solution comprises no carrier component.

The carrier component of the extraction solution may be chosen among organic solvents such as aryl ether, acetophenone, benzyl alcohol, o-phenyl phenol, bisphenyl, butyl benzoate, diallyl phthalate, benzoic acid, toluene, and/or mixtures thereof. Preferably, the carrier component is chosen among aryl ether, acetophenone, benzyl alcohol, and/or mixtures thereof, and most preferably is benzyl alcohol.

The carrier component of the extraction solution may be comprised to in the extraction solution in amounts ranging of from 20 to 40 g/l when the liquor ratio is between 1:1 and 1:20, provided that the sum of the salt and carrier components is of from 20 g/l to 60 g/l and preferably is of from 20 g/l to 40 g/l.

The carrier component of the extraction solution may be comprised in the extraction solution in amounts ranging of from 0 to 40 g/l, more preferably of from 0 to 25 g/l when the liquor ratio is between 1:20 and 1:60 or between 1:60 and 1:180, provided that the sum of the salt and carrier components is of from 20 g/l to 80 g/l and preferably is of from 20 g/l to 65 g/l, more preferably of from 20 to 45 g/l.

The carrier component of the extraction solution may be more preferably present in an amount of from 0 to 10 g/l, when the liquor ratio is between 1:60 and 1:180 or between 1:100 and 1:180; provided that the sum of the salt and carrier components is of from 20 g/l to 50 g/l, more preferably of from 20 to 40 g/l.

Optionally, the extraction solution may comprise additives known in the art such as for example dispersion agents, detergents or tensides in useful concentrations known in the art.

It is believed that in the process according to the present invention, the extraction solution provokes a swelling, or opening, of the aramid fiber or filament, thus allowing the one or more residuals to diffuse into the extraction solution and thus to significantly reduce their concentration in the aramid fiber or filaments being treated. After the residuals diffuse out of the aramid fiber, the fiber or filament is reconsolidated, i.e. closed, such that residuals may not re-enter.

After the aramid fiber or filaments are introduced into the previously described extraction solution according to the step a) in the process of the present invention, the aramid fibers or filaments are subsequently subjected to a first treatment in step b) by adjusting the extraction solution and the aramid fibers or filaments to a temperature of from 80° C. to 140° C., more preferably of from 120° C. to 140° C., and most preferably to a temperature of from 120° C. to 130° C., and maintaining such temperature to for at least 20 minutes, preferably for of from 20 to 120 min and more preferably for of from 20 to 60 minutes, and removing the aramid fibers or filaments from the extraction solution in step c).

Following the above first treatment, the aramid fibers or filaments are introduced into a first aqueous rinsing solution optionally adjusted to a pH ranging from of 2 to 7 in step d), and are subsequently subjected to a second treatment in step e) by adjusting the first rinsing solution and the aramid fibers or filaments to a temperature of from 70° C. to 100° C. and more preferably of from 80° C. to 100° C., and maintaining such temperature for at least 10 minutes, preferably of from 10 to 60 min and more preferably of from 30 to 40 minutes, and removing the aramid fibers or filaments from the first rinsing solution in step f).

In an exemplary embodiment of the present invention, the first rinsing solution may consist of an aqueous solution of acetic acid adjusted to a pH of 5.

The process according to the present invention may optionally further comprise a step g) of introducing the aramid fibers or filaments into a second aqueous rinsing solution adjusted to a neutral pH, and subsequently subjecting the aramid fibers or filaments to a third treatment in step h) by adjusting the second rinsing solution and the aramid fibers or filaments to a temperature of from 10° C. to 70° C. and maintaining such temperature for at least 10 minutes, preferably of from 10 to 60 min and more preferably of from 30 to 40 minutes, and removing the aramid fibers or filaments from the second rinsing solution in step i).

Optionally, the first and second aqueous rinsing solutions may comprise additives known in the art such as for example dispersion agents, detergents or tensides in useful concentrations known in the art.

The purpose of the first and second aqueous rinsing solutions in the process of the present invention is to remove remaining extraction solution from the aramid fibers or filaments.

It is to be understood that by "introduction of the aramid fiber or filament into a solution" it is meant that the aramid fiber or filament may be actively introduced into a solution contained in a container, or that a to solution may be added to the aramid fiber or filament contained in a container. Likewise, by "removal of the aramid fiber or filament from a solution" it is meant that the aramid fiber or filament can be actively removed from a solution, or that the solution may be drained from the container holding the aramid and the solution.

The process according to the present invention is suitable to be carried out on aramid filament or fiber in a unconsolidated form such as loose, carded, not carded, and sliver filament or fiber, aramid fiber or filament pulp, or on woven or non-woven fabrics comprising aramid fiber or filament.

Preferably, the aramid fiber or filament used in the present process is a meta-aramid fiber or filament.

The present invention further provides for a aramid fiber or filament obtainable by the process described above, comprising less than 1 weight percent or of from 0.01 to 1 weight percent, preferably comprising less than 0.2 weight percent or of from 0.01 to 0.2 weight percent, and more preferably comprising less than 0.1 weight percent or of from 0.01 to 0.1 weight percent, of a solvent used in the manufacture of aramid fibers or filament, such as for example aprotic solvents N-methyl-2-pyrrolidone (NMP), 1,3-Dimethyl-2-Imidazolidinone (DMI) or N,N-dimethylacetamide (DMAC), the weight percent being based on the total weight of the fiber.

The present invention further provides for a aramid fiber or filament obtainable by the process described above, comprising less than 1 weight percent or from 0.01 to 1 weight percent, more preferably less than 0.2 weight percent, or from 0.01 to 0.2 weight percent, and more preferably comprising less than 0.1 weight percent or of from 0.01 to 0.1 weight percent of a chlorobenzene or its derivatives such as for example ortho-dichlorobenzene, the weight percent being based on the total weight of the fiber.

The present invention further provides for a heat, flame and arc resistant fabric, as well as a garment made thereof, comprising the aramid fiber or filament obtainable by the process according to the present invention. Examples of such garment are fire fighter gear, foundry protective apparel and others.

A significant advantage of the process according to present invention is that it may be carried out on virtually any commercially available aramid in its retail form such as for example yarn, tops, spools or rolls of textile material, and that the one or more residuals can therefore be removed in conventional dyeing machinery readily available to textile converters, instead of modifying the highly sensitive production or spinning processes for aramid. It should, however, be understood that the process according to the present invention may be performed immediately after the actual production or spinning process, and preferably in-line, when production volumes justify such an arrangement.

A further advantage of the process according to present invention is that the treated aramid fiber or filaments will have an increased crystallinity when compared to untreated fibers or filaments, which will translate into a improved thermal protective effect in the case where the aramid fiber or filament is incorporated into heat, flame and arc resistant garments, as well as increased mechanical properties such as abrasion resistance and dimensional stability when washed.

Yet another advantage of the process according to the present invention is that the treated aramid fiber or filament will have an improved resistance against re-contamination with the previously removed residuals, because the aramid fiber or filaments will be more crystalline after being exposed to the present process.

In addition, the process according to the present invention, when applied to a aramid fabric, yields a fabric that is less prone to pilling.

EXAMPLES

Example 1

Nomex®

5 grams of a olive green pigmented poly (metaphenylene isophthalamide) staple fiber, commercially available from E. I. du Pont de Nemours and Company (Wilmington Del., US) under the trademark NOMEX N307 were mixed to 100 ml of analysis grade methanol in an 250 ml Erlenmeyer flask. The mixture of fiber and methanol was then kept at 42° C. for 120 minutes under constant stirring at 150 rpm.

After 120 minutes at 42° C., the methanol fraction was decanted, filtered and stored. A portion of the thus obtained methanol fraction was inserted into a gas chromatograph (GC) vial as Sample 1, to be analyzed for traces of N,N-dimethylacetamide. Results are shown in Table 1.

Example 2

Nomex®

The methanol fraction inserted into a gas chromatograph (GC) vial as Sample 2 was obtained and analyzed as under Example 1, but with the difference that the tested poly (metaphenylene isophthalamide) staple fiber was previously treated by introducing 33.3 grams of olive green pigmented poly (metaphenylene isophthalamide) staple fiber, commercially available from E. I. du Pont de Nemours and Company (Wilmington Del., US) under the trademark NOMEX N307 into 1000 ml of an aqueous extraction solution adjusted to a pH of 4.5 with acetic acid, containing 20 grams per liter of benzyl alcohol, 20 grams per liter of sodium nitrate, and adjusting the mixture of fiber and aqueous extraction solution to a temperature of 130° C. by heating and keeping it at 130° C. for 40 minutes under constant stirring in a laboratory dyeing machine (AHIBA), removing the fiber from the aqueous extraction solution, introducing the fibers into an aqueous rinsing solution consisting of water at a temperature of 98° C. and keeping it at 98° C. for 30 minutes under constant stirring, removing the fiber from the aqueous rinsing solution, and subsequently drying the fibers at 150° C. for 30 minutes in an oven.

Table 1: Shows the concentration of DMAC in an aramid fiber in weight percent for a sample that has not been treated in the process of the present invention (Sample 1) and for a sample that has been treated in the process of the present invention (Sample 2).

TABLE 1

| | N,N-climethyacetamide (DMAC) [in weight percent, based on the total weight of the fiber] |
|---|---|
| Sample 1 | 0.37 |
| Sample 2 | 0.07 |

As can be seen in Table 1, treating an aramid fiber according to the process of the present invention will reduce the content of DMAC by about 5-fold.

Example 3

Nomex® Pigmented 5 grams of a olive green pigmented poly (metaphenylene isophthalamide) staple fiber, commercially available from E. I. du Pont de Nemours and Company (Wilmington Del., US) under the trademark NOMEX N303, were mixed to 100 ml of analysis grade methanol in an 250 ml Erlenmeyer flask. The mixture of fiber and methanol was then kept at 42° C. for 120 minutes under constant stirring at 150 rpm.

After 120 minutes at 42° C., the methanol fraction was decanted, filtered and stored. A portion of the thus obtained methanol fraction was inserted into a gas chromatograph (GC) vial as Sample 3, to be analyzed for traces of ortho-dichlorobenzene (ODCB). Results are shown in Table 2.

Example 4

Nomex® Pigmented Treated

The methanol fraction inserted into a gas chromatograph (GC) vial as Sample 4 was obtained and analyzed as under Example 3, but with the difference that the tested poly (metaphenylene isophthalamide) staple fiber was previously treated by introducing 33.3 grams of green pigmented poly (metaphenylene isophthalamide) staple fiber, commercially available from E. I. du Pont de Nemours and Company (Wilmington Del., US) under the trademark NOMEX N303 into 1000 ml of an aqueous extraction solution adjusted to a pH of 4.5 with acetic acid, containing 20 grams per liter of benzyl alcohol, 40 grams per liter of sodium nitrate, and adjusting the mixture of fiber and aqueous extraction solution to a temperature of 130° C. by heating and keeping it at 130° C. for 40 minutes under constant stirring in a laboratory dyeing machine (AHIBA), removing the fiber from the aqueous extraction solution, introducing the fibers into an aqueous to rinsing solution consisting of water at a temperature of 15° C., removing the fiber from the aqueous rinsing solution, and subsequently drying the fibers at 150° C. for 30 minutes in an oven.

Example 5

Nomex® Pigmented Treated

The methanol fraction inserted into a gas chromatograph (GC) vial as Sample 5 was obtained and analyzed as under Example 3, but with the difference that the tested poly (metaphenylene isophthalamide) staple fiber was previously treated by introducing 33.3 grams of olive green pigmented poly (metaphenylene isophthalamide) staple fiber, commercially available from E. I. du Pont de Nemours and Company (Wilmington Del., US) under the trademark NOMEX N303 into 1000 ml of an aqueous extraction solution adjusted to a pH of 4.5 with acetic acid, containing 40 grams per liter of benzyl alcohol, 40 grams per liter of sodium nitrate, and adjusting the mixture of fiber and aqueous extraction solution to a temperature of 130° C. by heating and keeping it at 130° C. for 40 minutes under constant stirring in a laboratory dyeing machine (AHIBA), removing the fiber from the aqueous extraction solution, introducing the fibers into an aqueous rinsing solution consisting of water at a temperature of 15° C., removing the fiber from the aqueous rinsing solution, and subsequently drying the fibers at 150° C. for 30 minutes in an oven.

Table 2: Shows the concentration of ortho-dichlorobenzene (ODCB) in an aramid fiber in weight percent for a sample that has not been treated in the process of the present invention (Sample 3) and for 2 samples that has been treated with two conditions of the process of the present invention (Sample 4 and 5).

TABLE 2

| | Ortho-dichlorobenzene (ODCB) [in weight percent, based on the total weight of the fiber] |
|---|---|
| Sample 3 | 27.4 ppm |
| Sample 4 | 3.99 ppm |
| Sample 5 | 1.38 ppm |

As can be seen in Table 2, treating an aramid fiber according to the process of the present invention will reduce the content of ortho-dichlorobenzene (ODCB) by more than about 10-fold.

What is claimed is:

1. A process for reducing the content of one or more residuals in aramid fibers or filaments, comprising, in this order, the steps of
    a. introducing the aramid fibers or filaments into a extraction solution being free of any coloring ingredient and adjusted to a pH ranging of from 2 to 7,
    b. adjusting the extraction solution and the aramid fibers or filaments to a temperature of from 80° C. to 140° C.
    c. removing the aramid fibers or filaments from the extraction solution
    d. introducing the aramid fibers or filaments into a first rinsing solution adjusted to a pH ranging of from 2 to 7,
    e. optionally comprising a detergent,
    f. adjusting the first rinsing solution and the aramid fibers or filaments to a temperature of from 70° C. to 100° C.,
    g. removing the aramid fibers or filaments from the first rinsing solution,
        wherein the extraction solution is an aqueous solution comprising of from 0 to 40 g/l of a salt component and of from 0 to 40 g/l of a carrier component, and wherein the sum of the salt and carrier components is of from 20 g/l to 80 g/l;
    wherein the process provides aramid fibers or filaments having 0.01 to 0.2 weight percent orthodichlorobenzene; N-methyl-2-pyrrolidone(NMP); 1,3-Dimethyl-2-Imidazolidinone(DMI); or N,N-dimethylacetamide (DMAC).

2. The process according to claim 1, further comprising the steps of
    h. introducing the aramid fibers or filaments into a second rinsing solution adjusted to a pH ranging from of 2 to 7, optionally comprising a detergent, i. adjusting the second rinsing solution and the aramid fibers or filaments to a temperature of from 10° C. to 70° C., j. removing the aramid fibers or filaments from the second rinsing solution.

3. The process according to claim 1, wherein a liquor ratio of aramid fibers or filaments to extraction solution is of from 1:1 to 1:180.

4. The process according to claim 1, wherein the extraction solution comprises the salt component in an amount ranging of from 0 to 20 g/l and the carrier component in an amount ranging of from 20 to 40 g/l, when the liquor ratio is between 1:1 and 1:20, provided that the sum of the salt and carrier components is of from 20 g/l to 60 g/l.

5. The process according to claim 1, wherein the extraction solution comprises the salt component in an amount ranging of from 20 to 40 g/l and the carrier component in an amount ranging of from 0 to 25 g/l when the liquor ratio is between 1:20 and 1:180; provided that the sum of the salt and carrier components is of from 20 g/l to 65 g/l.

6. The process according to claim 1, wherein the extraction solution is adjusted to a pH ranging from of 3 to 5.

7. The process according to claim 1, wherein the aramid fibers or filaments are meta-aramid fibers or filaments.

8. A meta-aramid fiber or filament obtained by the process of claim 7, wherein it comprises less than 0.1 weight percent of orthodichlorobenzene, and wherein the meta-aramid fiber or filament is a dried, crystalline meta-aramid fiber or filament obtained by dryspinning.

9. A yarn comprising the meta-aramid fiber or filament of claim 8, and at least one anti-static fiber.

10. A heat, flame and arc resistant garment comprising the aramid fiber or filament according to claim 8.

11. A heat, flame and arc resistant fabric comprising the aramid fiber or filament according to claim 8.

12. A meta-aramid fiber or filament obtained by the process of claim 7, wherein it comprises less than 0.1 weight percent of N-methyl-2-pyrrolidone or N,N-dimethylacetamide, and wherein the meta-aramid fiber or filament is a dried, crystalline meta-aramid fiber or filament obtained by dry-spinning.

* * * * *